June 30, 1959

G. R. OVERMAN 2,892,359

STEERING WHEEL

Filed March 11, 1957

INVENTOR.
Guy R. Overman
BY
His Attorney

June 30, 1959 G. R. OVERMAN 2,892,359
STEERING WHEEL
Filed March 11, 1957 2 Sheets-Sheet 2

INVENTOR.
Guy R. Overman
BY
His Attorney

United States Patent Office 2,892,359
Patented June 30, 1959

2,892,359

STEERING WHEEL

Guy R. Overman, Dayton, Ohio, assignor to General Motors Corporation, Detroit, Mich., a corporation of Delaware Application March 11, 1957, Serial No. 645,031

1 Claim. (Cl. 74—484)

This invention relates to improvements in steering wheels for automotive vehicles.

A steering wheel such as is generally used in connection with present day motor vehicles comprises essentially a dish-shaped metal skeleton composed of a rim, a hub insert and connecting spokes, which is covered by a hard rubber layer or covering of substantial thickness. The horn switch mechanism, in order that it is readily accessible to the operator of the vehicle, is generally associated with the hub of the wheel and is actuated by means of a horn ring supported on the wheel hub and extending to a point intermediate the hub and rim. In the interest of greater safety steering wheels have been designed wherein the hub is deeply recessed from the plane of the rim so as to minimize the danger of impaling the vehicle operator on the steering wheel hub in the event of an auto accident. While this structure is beneficial, it creates problems in suitably mounting the horn ring and more importantly does not eliminate the need of a horn ring which in itself may be a source of danger in that it may obstruct the operator's vision and tend to shatter on impact.

Among the objects of this invention is to provide a steering wheel which presents a soft rubber surface to the motor vehicle operator and has a horn actuating ring or switch contact incorporated within the rim covering of the wheel to eliminate the use of an exposed horn actuating ring, whereby a greater measure of safety is provided for the operator. These and other objects are accomplished by forming a wheel which comprises an annular metal rim member covered by a non-metallic layer of substantial thickness wherein substantially the upper annular half thereof is formed of a soft rubber, and an annular space is provided in the soft rubber portion, adjacent the rim member, in which a horn actuating ring or contact is disposed and carried by the soft rubber portions in a normally spaced relation to the rim. The metal rim member is preferably electrically grounded to form a stationary contact and the horn ring is connected in the horn electrical circuit to form a movable contact. The annular space within the rim covering extends a predetermined distance in a predetermined direction toward the outer surface of the soft rubber portion whereby a relatively thin annular soft rubber portion of the rim cover is integrally attached to and supported by relatively thicker soft rubber portions of the rim cover and which supports the horn actuating ring and may be readily deformed by finger pressure to bring the horn actuating ring into contact with the electrically grounded metal rim.

A steering wheel of the present invention may be made by first molding a suitable rubber composition about a wheel skeleton including a metal hub insert, the rim and the connecting spokes, whereby only substantially the lower half of the rim covering is formed and the rim member is exposed. This portion of the wheel may be formed of a soft rubber or more conveniently of a hard rubber which may be readily trimmed after the molding thereof. The corresponding upper portion of the rim cover is separately molded of a soft rubber composition. It is preferably molded to include a horn ring preferably embedded in a wall of the annular groove formed in the side of the member which mates with the lower rim portion. The annular groove and horn ring are positioned over the rim member of the lower rim cover portion. The upper and lower rim cover portions are then vulcanized or cemented together to form a rim having an integral cover thereover.

Further objects and advantages of the present invention will be apparent from the following description, reference being had to the accompanying drawings, wherein preferred embodiments of the invention are clearly shown.

Figure 1:
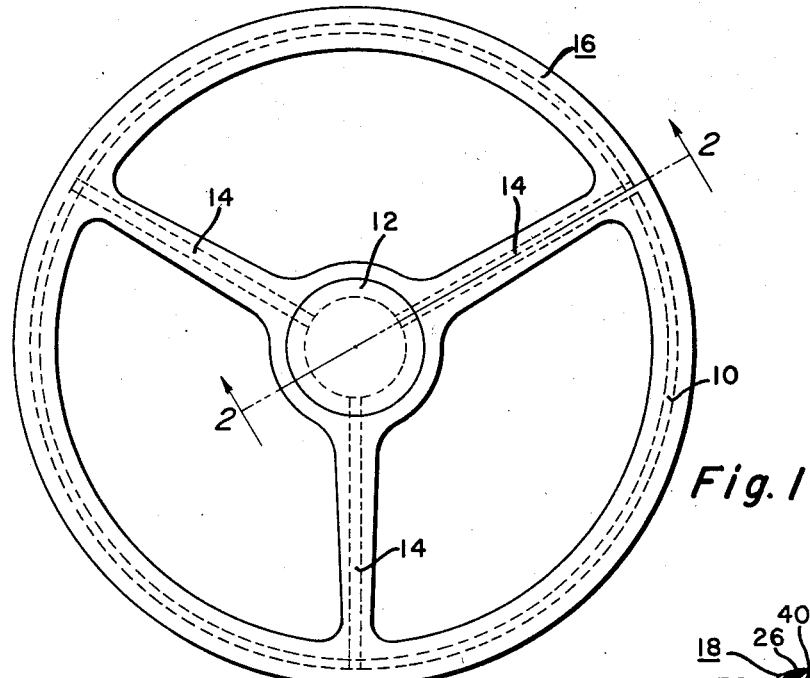
Figure 1 is a top view of a steering wheel.

Referring to the drawings, Figure 1 illustrates a conventional concept of a steering wheel embodying the present invention which involves an annular metal rim 10 and a hub insert 12 connected by a plurality of spokes 14, forming a metal skeleton covered by a relatively thick rubber portion 16.

Figure 2:
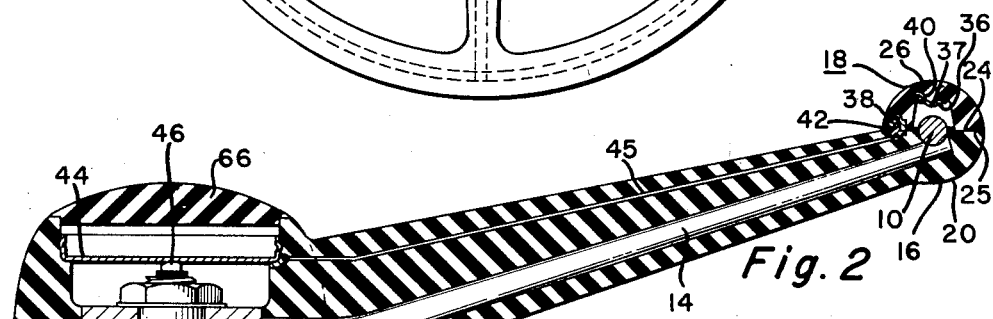
Figure 2 is a cross-sectional view taken along line 2—2 of Figure 1.

The present invention involves elimination of the conventional external horn blowing ring and a provision of a horn blowing mechanism within a soft rubber portion of the steering wheel rim cover which faces the motor vehicle operator. An embodiment of the structure is shown in Figure 2 wherein the rim cover is formed of upper and lower substantial half portions 18 and 20 respectively. The lower half portion of 20 consists of a non-metallic mass as for example hard rubber which includes the rim member 10 partially embedded in the rubber, preferably to an extent so that the largest diameter of the rim 10 is securely located within the material of the cover portion 20. The rim member 10 is connected to a hub insert 12 by means of a plurality of spokes 14 and the latter elements are molded within the non-metallic mass formed integrally with the non-metallic cover portions of the cover half 20. The non-metallic mass of the cover portion 20 and the non-metallic mass covering the spokes and the hub insert 12 may be made of soft rubber, or various moldable plastic materials such as hard rubber, the hard rubber being preferred because of its cheapness and because the mold flash incident to the molding thereof may be readily trimmed.

The upper rim cover portion 18 is separately formed of a soft rubber and vulcanized or cemented to lower rim cover portion 20. As may be seen in relation to Figure 3 it includes an annular groove 22 which extends from its base 24 into the body thereof so as to form a relatively thin annuar portion 26 integrally attached to and supported by relatively thicker portions 28 and 30. The relatively thin portion 26 carries an annular horn ring or contact 32 preferably partially embedded therein or otherwise secured thereto, which is normally spaced from the rim 10. The face 24 of the rim cover portion 18 and the face 25 of the lower rim cover portion 20 are preferably provided with inner-locking means as for example the projections 34 of the lower rim cover extending into the groove 22 of the upper rim cover. The upper rim cover 18 is vulcanized or cemented to the lower rim cover 20 by the provision of a suitable cement and by the application of heat and pressure as is well known in the art.

Figure 3:
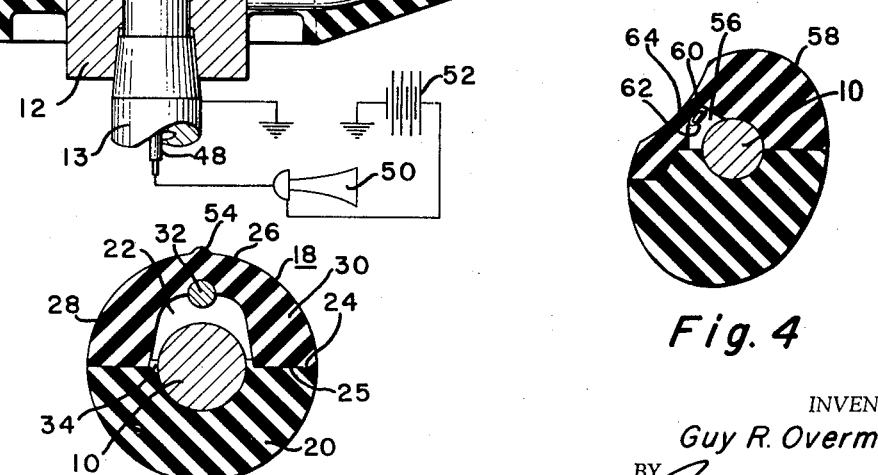
Figure 3 is a cross-sectional view of a steering wheel embodying the present invention.

The rim 10 is mechanically and electrically connected to the hub 12 through the spokes 14 and the hub is an electrical contact with the electrically grounded steering shaft 13. The horn ring which forms a movable connection of the horn actuating mechanism is shown in Figure 3 in the form of an annular rod 32 partially embedded in the upper rim cover 18. In Figure 2 it is shown in the form of a flat annular ring 36 having a downwardly directed rib or bead 37. As shown in Figure 2 the horn ring 37 is electrically connected to a socket 38 provided in the face 24 of the upper rim portion 18 by a lead 40. The socket 38 receives a plug 42 partially embedded in the lower rim cover portion 20 which is connected to a metal cup-like member 44 supported within the hub, by means of a lead 45 embedded in a spoke. The cup member 44 is electrically connected to the end 46 of a lead 48 which is passed through a bore in the shaft 13 and is insulated therefrom. The lead 48 is electrically connected to a horn 50 which in turn is connected to a battery 52 having one terminal thereof grounded. The described manner of connecting the rim member 10 and the horn ring 37 in the horn circuit through the hub is intended to be illustrative since this may be done in several ways well known in the art.

To operate the horn ring it is only necessary to apply finger pressure over the relatively thin portions 26 of the upper rim cover portion 18 to cause the horn ring 32 to contact the rim 10 and energize the horn circuit. The portions 28 and 30 and the upper rim cover 18 are of substantial thickness and capable of standing significant distortion so as to prevent actuation of the horn blowing mechanism in the course of the normal operation of the steering wheel. Since the horn ring may be depressed by finger pressure only in the limited annular area of the thin rubber section 26 and the force must be directed substantially on a radial line passing through the centers of the cross sections of the horn ring 32 and the rim 10, it is desirable to provide an external rib 54 along this line whereby the operator may readily locate the horn blowing area.

Figure 4:
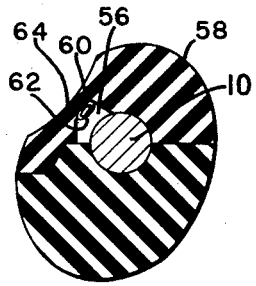
Figure 4 is a cross-sectional view of another embodiment of the invention.

Figure 4 shows another embodiment wherein the groove 56 of the upper rim cover portion 58 projects radially inwardly of the wheel rim within easy reach of the operator's thumb. The horn blowing area is preferably located by a shallow groove 64 which more or less fits the contour of a thumb and also functions to permit the groove 56 to be relatively shallow and yet provide a relatively thin rubber horn ring carrying section 60. It is readily apparent that in this embodiment there is virtually no possibility of actuating the horn blowing mechanism in the normal operation of the wheel.

The horn blowing ring may suitably be in the form of a flat ring having an annular contact bead such as 37 of Figure 2 or the annular rod of Figure 3. The horn ring may also be in the form of an annular coil spring which is preferred for use in connection with the embodiment shown in Figure 4, since a rigid horn ring in this embodiment would have to be moved against the elastic resistance of the soft rubber in a direction of the plane of the wheel rim and would require considerable finger pressure to move the rod into contact with the rim of the wheel. The coil spring member 62 in this embodiment will deform in the locality of the finger pressure to permit contact thereof with the wheel rim in response to normal finger pressure.

As indicated above the lower rim cover portion 20, spoke and hub may be formed of either soft rubber or a hard non-metallic material such as hard rubber, the hard rubber being preferred because of its cheapness and manufacturing advantages and because it provides the wheel with greater structural rigidity and strength than the soft rubber. The upper cover portion 18 is formed of a soft elastic rubber. The horn cap 66 is also formed of soft rubber in the interest of safety.

An example of a suitable hard rubber recipe which may be used may include about 78 parts GRS (a butadiene-styrene copolymer), 64 parts ground rubber scrap, 18 parts hard carbon black, 21 parts hydrocarbon oil, 200 parts ground limestone, 12 parts mineral bitumen, 4 parts organic accelerator, 7.5 parts hydrated calcium oxide, 45 parts zinc oxide, and 22 parts sulphur. Other hard rubber recipes well known in the art may be used as other well known moldable plastic materials which on curing form a hard rigid mass.

A soft rubber recipe which may be used may include 48.35 parts natural rubber, 2 parts stearic acid, 40 parts zinc oxide, 6.60 parts titanium dioxide, 1.5 parts sulphur, .5 part palm oil, .5 part anti-oxidant, .5 part Altax accelerator (benzo phthiazol), .05 part Tuads accelerator (tetramethylthiuram disulfide). Other soft rubber recipes well known in the art and including butadiene-acrylonitrile copolymer, natural rubber, polychloroprene, mixtures of these materials and other resilient rubber-like materials may be used.

Various rubber base cement may be used to bound the parts together. Thus for example a fast curing rubber cement may be used which consists of polychloroprene dissolved in toluol and containing magnesium oxide and sulphur as curing agents, carbon black and a suitable anti-oxidant and organic accelerator. A suitable natural rubber base cement which may be used includes natural rubber dissolved in naphthol or toluol containing sulphur and stearic acid as curing agents, carbon black and an appropriate anti-oxidant and organic accelerator.

Figure 5:
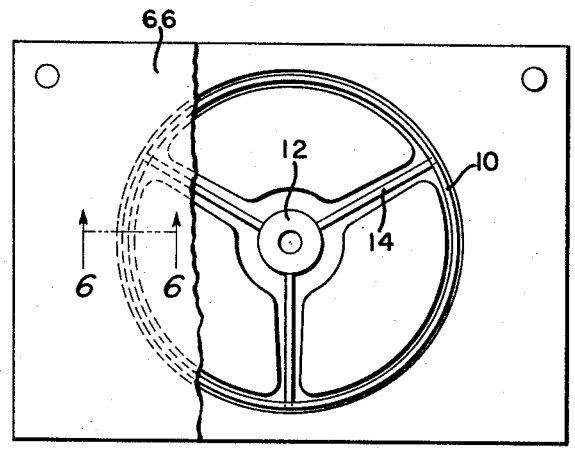
Figure 5 is a steering wheel associated with the mold for making a portion of the wheel.
Figure 6:
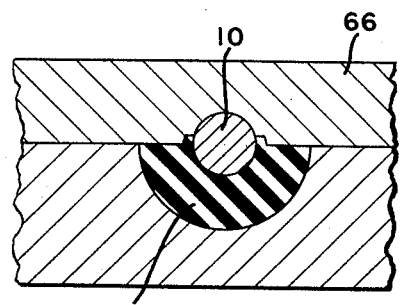
Figure 6 is a cross-sectional view taken along line 6—6 of Figure 5.
Figure 7:
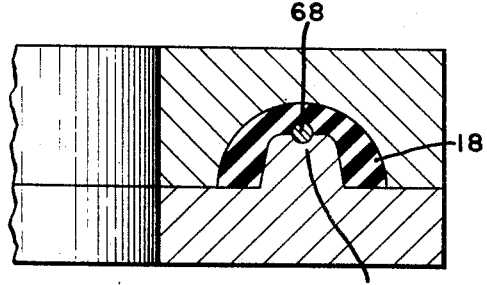
Figure 7 is a cross-sectional view of a mold for making another portion of the steering wheel rim cover.

Figures 5 through 7 illustrate a method of separately molding the upper and lower portions 18 and 20 of the steering wheel rim cover. As shown in Figures 5 and 6 a mold is provided for molding hard or soft rubber or other suitable material about the hub insert 12, spokes 14 and the rim member 10. The wheel skeleton is supported within the mold cavity in a properly spaced relation by means of the hub 12 and the upper half 66 of the mold in an obvious manner. In molding the upper rim cover portions, the horn ring 68 is supported in an annular recessed groove on the annular project 70 of the mold corresponding to the annular groove to be formed in the upper rim cover portion. The horn ring 68 may be coated with a suitable cement so that in the molding process the horn ring is firmly bound to and embedded in the upper rim cover 18.

After the upper and lower rim cover portions have been molded they are preferably partially vulcanized or cured. Thereafter a suitable cement is applied between the mating parts and the assembly is placed in a suitable mold or a pressure fixture wherein heat and pressure is applied to firmly bond the parts together.

While the embodiments of the present invention as herein disclosed constitute preferred form, it is to be understood that other forms may be adopted.

What is claimed is as follows:

A hand wheel adapted for use as a steering wheel on automotive vehicles, comprising, a hub, spokes extending radially outwardly from said hub, an annular metal rim member attached to said spokes adjacent to outer ends of said spokes and having an upper-half periphery and a lower-half periphery, a mold-formed covering of relatively hard elastomeric material surrounding at least a portion of said hub and all of said spokes yet only surrounding the lower-half periphery of said annular metal rim member left with substantially all of the upper-half periphery exposed above a face of said covering extending radially of said annular metal rim member at substantially diametrically opposite portions thereof defined by a juncture of the upper-half periphery and the lower-half periphery, projections protruding upwardly slightly from the face of said covering to an extent so that said rim member is securely located relative to the face of said covering surrounding only the lower-half periphery thereof, an annular upper rim cover separately formed of a relatively softer elastomeric material and including a relatively thin annular portion integral and intermediate relative to a pair of spaced-apart relatively thicker portions adapted to provide a base complementary and bonded in sealed relation to said face of said relatively hard covering, said annular upper rim cover providing a sealed cavity surrounding said upper-half periphery of said member, said annular upper rim cover being spaced from said annular metal rim member by said projections which also serve as inner locking means between said relatively hard covering and said pair of spaced-apart relatively thicker portions of said upper cover bonded to said face of said covering, a metal horn ring embedded relative to said relatively thin intermediate annular portion of said upper cover and located to have a periphery of said ring exposed in the sealed cavity surrounding the upper-half periphery of said annular metal rim, and an annular external rib formed integrally with said intermediate relatively thin annular portion of said upper cover at a location radially in alignment with said metal horn ring and adapted to be subjected to pressure for deflecting said relatively soft upper cover and particularly said metal horn ring into electrical contact with said upper-half periphery of said annular metal rim member.

References Cited in the file of this patent

UNITED STATES PATENTS

| | | |
|---|---|---|
| 2,025,976 | Getty | Dec. 31, 1935 |
| 2,025,977 | Getty | Dec. 31, 1935 |
| 2,025,979 | Getty | Dec. 31, 1935 |
| 2,025,980 | Getty | Dec. 31, 1935 |
| 2,025,981 | Getty | Dec. 31, 1935 |
| 2,705,816 | Sampson | Apr. 12, 1955 |